(12) United States Patent
Shi et al.

(10) Patent No.: US 12,257,559 B2
(45) Date of Patent: Mar. 25, 2025

(54) DEVICE AND APPARATUS FOR MIXING AND DISPERSING SOLID AND LIQUID

(71) Applicant: Shangshui Smartech Ltd., Guangdong (CN)

(72) Inventors: Qiao Shi, Guangdong (CN); Shujuan Bai, Guangdong (CN); Xudong Jin, Guangdong (CN)

(73) Assignee: Shangshui Smartech Ltd., Guangdong (CN)

( * ) Notice: Subject to any disclaimer, the term of this patent is extended or adjusted under 35 U.S.C. 154(b) by 0 days.

(21) Appl. No.: 18/512,965

(22) Filed: Nov. 17, 2023

(65) Prior Publication Data

US 2024/0082794 A1 Mar. 14, 2024

Related U.S. Application Data

(63) Continuation of application No. PCT/CN2022/118601, filed on Sep. 14, 2022.

(30) Foreign Application Priority Data

Sep. 23, 2021 (CN) .......................... 202111117446.9

(51) Int. Cl.
*B01F 23/50* (2022.01)
*B01F 23/53* (2022.01)
(Continued)

(52) U.S. Cl.
CPC .............. *B01F 23/56* (2022.01); *B01F 23/53* (2022.01); *B01F 27/111* (2022.01); *B01F 27/90* (2022.01);
(Continued)

(58) Field of Classification Search
CPC ..................................................... B01F 23/56
(Continued)

(56) References Cited

U.S. PATENT DOCUMENTS 3,256,181 A * 6/1966 Zingg ..................... B01F 35/82
507/924
3,606,270 A * 9/1971 Zimmerly ............... B01F 25/64
366/263
(Continued)

FOREIGN PATENT DOCUMENTS

CN 1543376 A 11/2004
CN 102350248 A 2/2012
(Continued)

OTHER PUBLICATIONS

International Search Report with English Translation for International Application No. PCT/CN2022/118601, mailed Dec. 16, 2022.
(Continued)

*Primary Examiner* — David L Sorkin
(74) *Attorney, Agent, or Firm* — Young Basile Hanlon & MacFarlane, P.C.

(57) ABSTRACT

A device and apparatus for mixing and dispersing a solid and a liquid are provided. The device includes a powder pulverizing mechanism fixedly connected to a main shaft. The powder pulverizing mechanism is located in a powder feed chamber. The powder feed chamber is provided with a powder feed port. A liquid feed chamber is arranged on an outer side of the powder feed chamber. The liquid feed chamber is provided with a liquid feed port, and the liquid feed chamber is provided therein with a dispersing mechanism fixedly connected to the main shaft. A lower portion of the liquid feed chamber and a lower portion of the powder feed chamber are separately in communication with an upper portion of a mixing chamber. The mixing chamber is provided therein with an impeller fixedly connected to the main shaft.

20 Claims, 6 Drawing Sheets

(51) Int. Cl.
    *B01F 27/111*     (2022.01)
    *B01F 27/90*      (2022.01)
    *B01F 35/75*      (2022.01)
    *B01F 35/93*      (2022.01)
    *B01F 23/00*      (2022.01)
    *B01F 27/2121*    (2022.01)
    *B01F 35/90*      (2022.01)

(52) U.S. Cl.
    CPC ........ *B01F 35/75455* (2022.01); *B01F 35/93* (2022.01); *B01F 23/023* (2022.01); *B01F 27/2121* (2022.01); *B01F 2035/98* (2022.01)

(58) Field of Classification Search
    USPC ................ 366/155.2, 164.6, 178.1, 263, 264
    See application file for complete search history.

(56)            References Cited

U.S. PATENT DOCUMENTS

| | | | |
|---|---|---|---|
| 3,998,433 | A | 12/1976 | Iwako |
| 4,175,873 | A * | 11/1979 | Iwako ............... B01F 25/90 366/178.3 |
| 4,850,704 | A * | 7/1989 | Zimmerly ............ B01F 25/641 366/264 |
| 5,932,270 | A | 8/1999 | Rock et al. |
| 7,287,897 | B2 * | 10/2007 | Schertenleib ....... B01F 33/8052 366/601 |
| 11,318,433 | B2 * | 5/2022 | Kamiya ................ B01F 23/43 |
| 2004/0213080 | A1 * | 10/2004 | Schertenleib ....... B01F 35/7179 366/171.1 |
| 2004/0218465 | A1 * | 11/2004 | Arribau ............... B01F 33/502 366/264 |
| 2006/0268657 | A1 * | 11/2006 | Schertenleib ....... B01F 35/7173 366/171.1 |
| 2009/0268547 | A1 | 10/2009 | Parkides |
| 2020/0222863 | A1 | 7/2020 | Onishi et al. |
| 2024/0066476 | A1 * | 2/2024 | Wang ................... B01F 27/27 |

FOREIGN PATENT DOCUMENTS

| | | |
|---|---|---|
| CN | 107530710 A | 1/2018 |
| CN | 108325420 A | 7/2018 |
| CN | 207667471 U | 7/2018 |
| CN | 108465388 A | 8/2018 |
| CN | 209155625 U | 7/2019 |
| CN | 110215857 A | 9/2019 |
| CN | 210993907 U | 7/2020 |
| CN | 112717795 A | 4/2021 |
| CN | 214810472 U | 11/2021 |
| JP | S5481559 A | 6/1979 |
| JP | H0515758 A | 1/1993 |
| JP | 2004249197 A | 9/2004 |
| JP | 2018085177 A | 5/2018 |
| JP | 2021518969 A | 8/2021 |
| KR | 101578152 B1 | 12/2015 |
| WO | 2021017740 A1 | 2/2021 |

OTHER PUBLICATIONS

Chinese First Office Action with English Translation for CN application No. 202111117446.9 dated Jun. 3, 2023.
Chinese Second Office Action with English Translation for CN application No. 202111117446.9 dated Aug. 29, 2023.
Extended European Search Report issued in corresponding EP Patent Application No. 22871857.3, dated Nov. 27, 2024, 9 pages.
Japanese Notice of Reasons For Refusal with English translation issued in corresponding JP Patent Application No. 2024-518518, dated Dec. 18, 2024, 6 pages.

* cited by examiner

DEVICE AND APPARATUS FOR MIXING AND DISPERSING SOLID AND LIQUID

CROSS-REFERENCE TO RELATED APPLICATION(S)

This application is a continuation of International Patent Application No. PCT/CN2022/118601, filed Sep. 14, 2022, which claims priority to Chinese Patent Application No. 202111117446.9, filed Sep. 23, 2021, the disclosures of both of which are hereby incorporated by reference in their entireties.

TECHNICAL FIELD

The disclosure relates to the field of powder-liquid mixing and dispersion, and particularly to a device and apparatus for mixing and dispersing a solid and a liquid.

BACKGROUND

In the fields such as battery manufacturing, food production, and drug preparation, a large quantity of powder particles and a small quantity of liquid are usually mixed to form a homogeneous and highly viscous solid-liquid mixture. A recirculation mixing and dispersing device can efficiently prepare a solid-liquid mixture. A liquid is recirculated between the recirculation mixing and dispersing device and a buffer tank. Powder is gradually fed into the recirculation mixing and dispersing device and mixed with the liquid to obtain a slurry. The slurry is recirculated in the system and is dispersed when passing through the recirculation mixing and dispersing device, until a satisfactory solid-liquid mixture is obtained. A technical solution of an existing recirculation mixing and dispersing device is described as follows.

Chinese Patent Application No. CN207667471U (referred to as "Patent 71U" below) discloses a solid-liquid mixing apparatus suitable for a highly viscous material, in which powder and a liquid are mixed and dispersed by a dispersing wheel, and then discharged by a twin-screw pump connected at the exit. By such a design, the discharge speed needs to match the feed speed of liquid and powder. An excessively high discharge speed leads to interrupted flow in the chamber and consequently a low slurry filling rate, affecting the mixing and dispersing effect. An excessively low discharge speed leads to a backflow of the slurry to block the powder passage, affecting the normal operation of the apparatus. In practice, it is difficult to control the discharge speed at an equilibrium point. To prevent the backflow of the slurry and blockage, the apparatus is generally set to operate at a high discharge speed and a low chamber filling rate. As a result, the mixing and dispersing effect is reduced.

Chinese Patent Application No. CN209155625U (referred to as "Patent 25U" below) discloses an apparatus for mixing a solid and a liquid. Chinese Patent Application No. CN110394082A (referred to as "Patent 82A patent" below) discloses an impeller assembly and a solid-liquid mixing apparatus using the same. In the two powder-liquid mixing and dispersing devices, the powder and the liquid are mixed and dispersed by a frustum-shaped impeller and then centrifugally discharged from the lower portion of the impeller, and no discharge pump needs to be additionally provided. For the two devices, the main dispersing area is a part having a large diameter at the lower portion of the impeller and close to the discharge opening. The discharge capacity is determined by the rotation speed of the impeller, which determines the dispersing strength in turn. Generally, to reach a specific dispersing strength, the impeller needs to operate at a particular rotation speed, which, however, cannot be set to an equilibrium point at which the discharge speed matches the feed speed. To prevent slurry backflow and blockage, the apparatus has to operate at a high discharge speed and a low chamber filling rate. As a result, the mixing and dispersing effect is reduced.

The circulation mixing and dispersing devices in the related art have the problem of slurry backflow or low filling rate in the dispersing area caused by the mismatch between the discharge speed and the feed speed, and cannot reach maximum capacity, failing to make full use of the apparatus productivity.

Therefore, in the field of powder-liquid mixing and dispersing, there is an urgent need for a device and apparatus for mixing and dispersing a solid and a liquid that have a high slurry filling rate and a good dispersing effect and can make full use of the apparatus capacity.

SUMMARY

An objective of the disclosure is to provide a device and apparatus for mixing and dispersing a solid and a liquid that have a high slurry filling rate and a good dispersing effect and can make full use of the apparatus capacity. In order to achieve the above objective, the disclosure adopts the following technical solutions.

According to a first aspect, a device for mixing and dispersing a solid and a liquid is provided and includes a powder pulverizing mechanism fixedly connected to a main shaft. The powder pulverizing mechanism is located in a powder feed chamber. The powder feed chamber is provided with a powder feed port. A liquid feed chamber is arranged on an outer side of the powder feed chamber. The liquid feed chamber is provided with a liquid feed port. The liquid feed chamber is provided therein with a dispersing mechanism fixedly connected to the main shaft. A lower portion of the liquid feed chamber and a lower portion of the powder feed chamber are separately in communication with an upper portion of a mixing chamber. The mixing chamber is provided therein with an impeller fixedly connected to the main shaft.

In a possible implementation, a lower portion of the mixing chamber is provided with a tangential discharge opening.

In a possible implementation, the liquid feed chamber surrounds the powder feed chamber, and the liquid feed chamber is of a ring-shaped structure.

In a possible implementation, the powder pulverizing mechanism includes multiple layers of blades. Such an arrangement can ensure that the powder can be pulverized into finer particles in the process of falling onto the bottom of the powder feed chamber.

In a possible implementation, the dispersing mechanism is a cylinder-shaped dispersing wheel.

In a possible implementation, the dispersing mechanism includes multiple stirring paddles distributed in a circumferential direction.

In a possible implementation, holes are defined on the dispersing wheel. Such an arrangement facilitates mixing of the slurry, and can achieve a good dispersing effect.

In a possible implementation, a gap between the dispersing wheel and an inner wall of the liquid feed chamber ranges from 0.5 millimeters to 10 millimeters, and a gap between the dispersing wheel and an outer wall of the liquid feed chamber ranges from 0.5 millimeters to 10 millimeters.

Further, the gap between the dispersing wheel and the inner wall of the liquid feed chamber ranges from 1 millimeter to 5 millimeters, and the gap between the dispersing wheel and the outer wall of the liquid feed chamber ranges from 1 millimeter to 5 millimeters.

In a possible implementation, a gap between the stirring paddle and an inner wall of the liquid feed chamber ranges from 0.5 millimeters to 10 millimeters, and a gap between the stirring paddle and an outer wall of the liquid feed chamber ranges from 0.5 millimeters to 10 millimeters. Further, the gap between the stirring paddle and the inner wall of the liquid feed chamber ranges from 1 millimeter to 5 millimeters, and the gap between the stirring paddle and the outer wall of the liquid feed chamber ranges from 1 millimeter to 5 millimeters.

Because the slurry is sheared by the dispersing mechanism in the narrow liquid feed chamber, a higher shearing strength is achieved. In addition, the liquid feed chamber is filled up with the slurry, there is a sufficient retention time for the slurry to be sufficiently dispersed.

In a possible implementation, a discharge dispersing mechanism, configured to disperse and discharge a slurry, is arranged in a discharge area at the lower portion of the mixing chamber.

According to a second aspect, an apparatus for mixing and dispersing a solid and a liquid is provided and includes the device according to the first aspect, where a lower portion of the device is connected to a sealing device, and a bearing and a motor are arranged at the lower portion of the device.

In the disclosure, the slurry is pumped into the liquid feed chamber in the device from a slurry buffer tank, is dispersed by the dispersing mechanism, and then enters the mixing chamber provided with the impeller. The slurry is driven by the dispersing mechanism to rotate after entering the liquid feed chamber. In addition, because the dispersing mechanism, the powder pulverizing mechanism, and the impeller are all connected to the main shaft and have the same rotation speed, the slurry keeps rotating after entering the mixing chamber, to form a liquid ring rotating downward. The liquid ring refers to a ring-shaped fluid formed by a liquid that flows downward. The slurry has a very low relative speed when coming into contact with the impeller, and is not likely to splash. In addition, the powder is pulverized into finer particles in the powder feed chamber, and then also rotates with the powder pulverizing mechanism. Because the lower portion of the powder feed chamber is in communication with the mixing chamber, the powder close to the mixing chamber is sucked by the slurry rotating downward in the mixing chamber into the mixing chamber for mixing. The slurry is homogeneously mixed with the powder in the mixing chamber, and then discharged to the slurry buffer tank. Because the device for mixing and dispersing a solid and a liquid are provided in the disclosure is a recirculation mixing and dispersing apparatus, the slurry is recirculated between the slurry buffer tank and the recirculation mixing and dispersing apparatus, until the slurry is sufficiently dispersed. During slurry dispersing, because the slurry in the liquid feed chamber is driven by new slurry fed to the liquid feed chamber to flow out of the liquid feed chamber, the liquid feed chamber can be filled up with the slurry, thereby avoiding problems of low slurry filling rate and poor dispersion effect caused by the arrangement of the dispersing mechanism in the discharge area at the lower portion of the mixing chamber.

LIST OF REFERENCE NUMERALS

Figure 1:
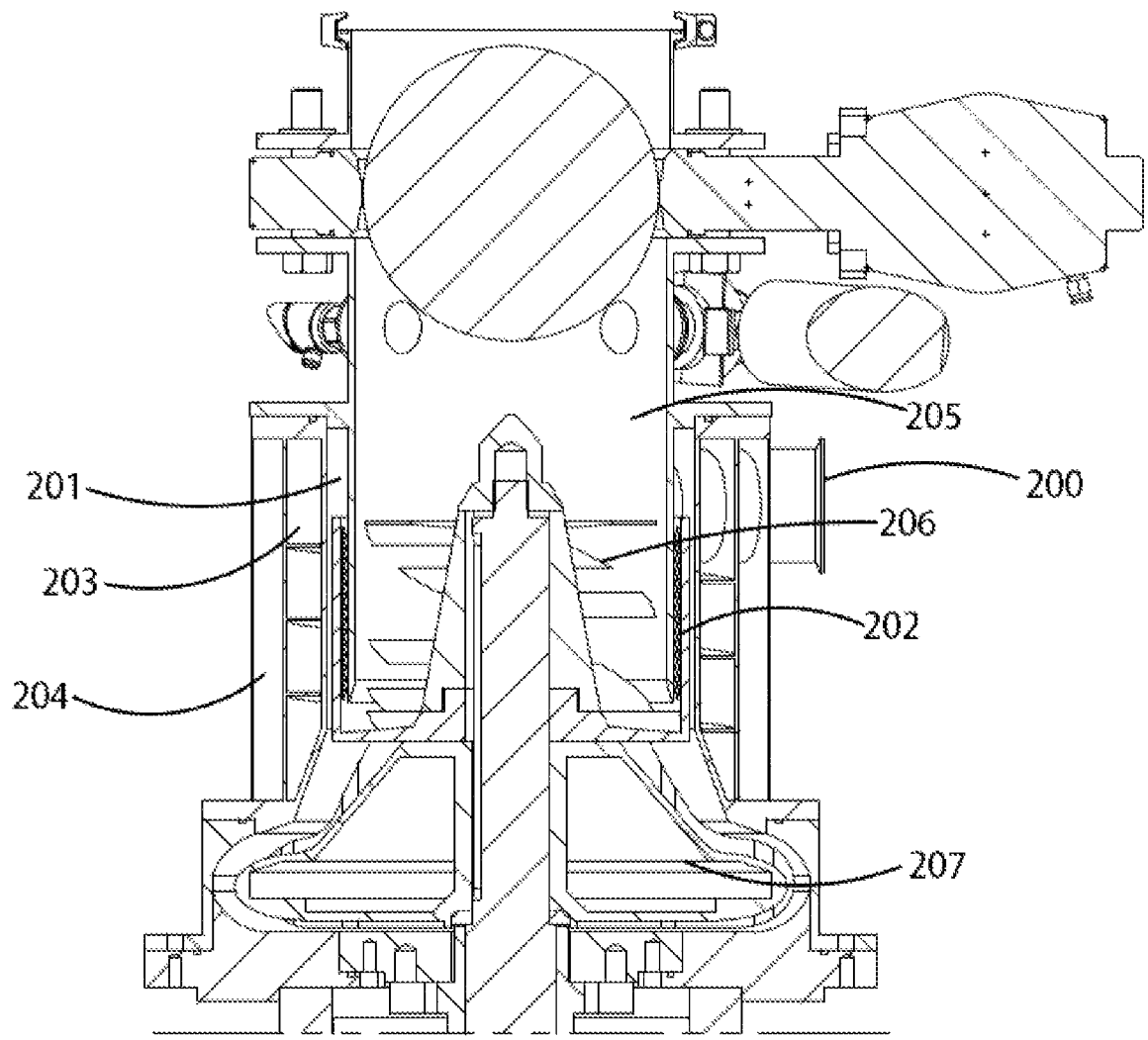
FIG. 1 is a schematic cross-sectional view of a device according to an implementation of the disclosure.

| 20 | Device |
| --- | --- |
| 200 | Liquid feed port |
| 201 | Liquid feed chamber |
| 202 | Dispersing mechanism |
| 203 | Cooling water interlayer |
| 204 | Heat insulation layer |
| 205 | Powder feed chamber |
| 206 | Powder pulverizing mechanism |
| 207 | Impeller |
| 208 | Discharge opening |
| 2020 | Dispersing wheel |
| 2021 | Hole |
| 2022 | Stirring paddle |
| 21 | Main shaft |
| 22 | Bearing |
| 23 | Sealing device |
| 24 | Motor |

DETAILED DESCRIPTION

To make the objectives, principles, technical solutions, and advantages of the disclosure clearer and more comprehensible, the disclosure is further described in detail below with reference to accompanying drawings and implementations. It should be understood that the specific implementations described in the disclosure are used to describe the disclosure, but are not intended to limit the disclosure.

It should be particularly noted that, in the description of the disclosure, the expressed orientation or positional relationship is the connection or positional relationship that can be determined according to the text or technical content of this specification based on the orientation or positional relationship shown in the drawings. For brevity of the drawings, some of the position change diagrams are omitted or not all of the position change diagrams are drawn, which shall not be construed as a limitation to the disclosure. It should be noted that for brevity of elaboration, the position change diagrams will not be described one by one in the following detailed description.

Figure 2:
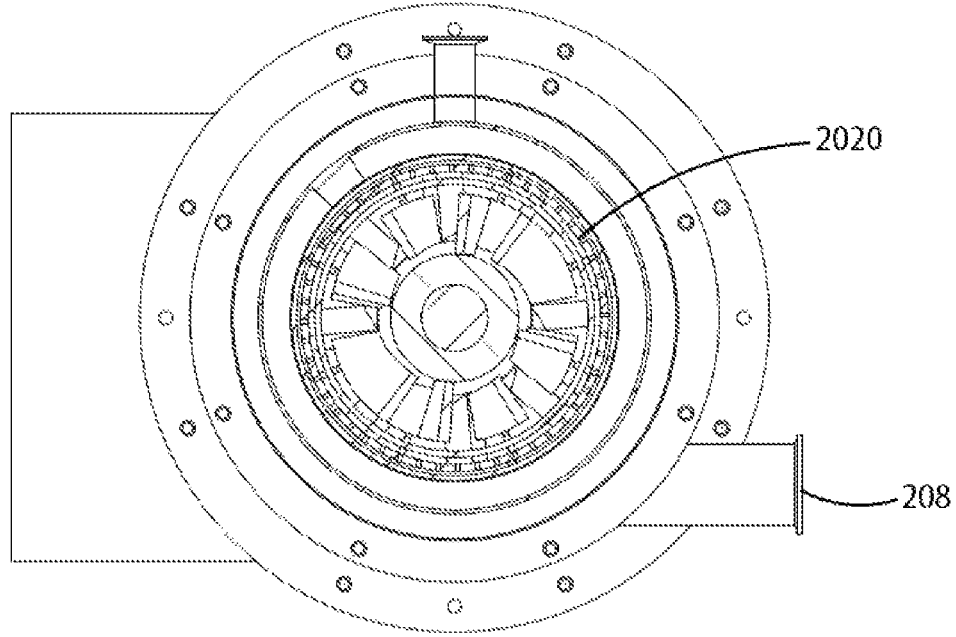
FIG. 2 is a top view of a device according to an implementation of the disclosure.

As shown in FIG. 1, a device 20 for mixing and dispersing a solid and a liquid is provided in the disclosure. The device 20 includes a powder pulverizing mechanism 206 fixedly connected to a main shaft 21. The powder pulverizing mechanism 206 is located in a powder feed chamber 205. The powder feed chamber 205 is provided with a powder feed port. A liquid feed chamber 201 is arranged on an outer side of the powder feed chamber 205. The liquid feed chamber 201 is provided with a liquid feed port 200. The liquid feed chamber 201 is provided therein with a dispersing mechanism 202 fixedly connected to the main shaft 21. A lower portion of the liquid feed chamber 201 and a lower portion of the powder feed chamber 205 are separately in communication with an upper portion of a mixing chamber. The mixing chamber is provided therein with an impeller 207 fixedly connected to the main shaft 21. A lower portion of the mixing chamber is provided with a tangential discharge opening 208, as shown in FIG. 2. The outer side of the powder feed chamber 205 means that the liquid feed chamber 201 and the powder feed chamber 205 are two independent containers. That is to say, when entering the device of the disclosure, powder and a liquid need to separately enter respective feed chambers for preliminary treatment before mixing. The preliminary treatment includes but is not limited to further dispersing of the powder or slurry. In addition, the tangential discharge opening 208 is a discharge passage formed by extending outward along the inner wall of the lower portion of the mixing chamber in the mixing chamber. A cooling water interlayer 203 is arranged on an outer side of the liquid feed chamber 201, to add cooling water to cool the slurry in the liquid feed chamber 201. A heat insulation layer 204 is arranged on an outer side of the cooling water interlayer 203. The heat insulation layer 204 causes the cooling water in the cooling water interlayer 203 to remain in a predetermined temperature range.

Figure 3:
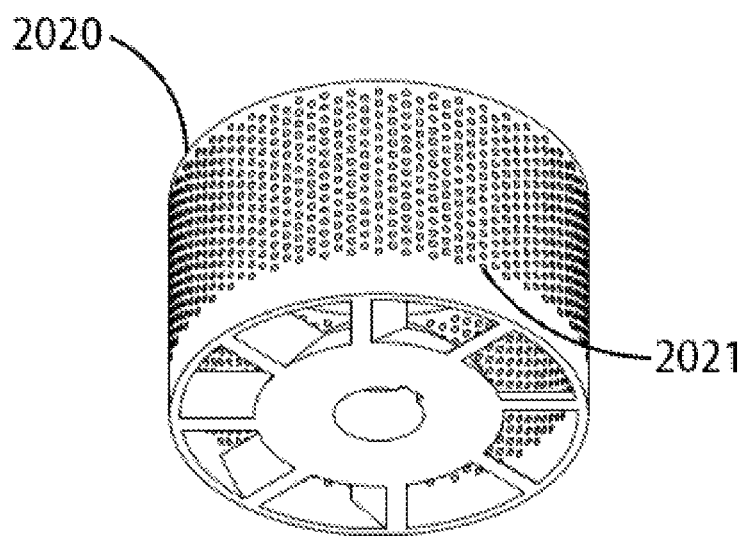
FIG. 3 is a schematic structural view of a dispersing mechanism according to an implementation of the disclosure.
Figure 4:
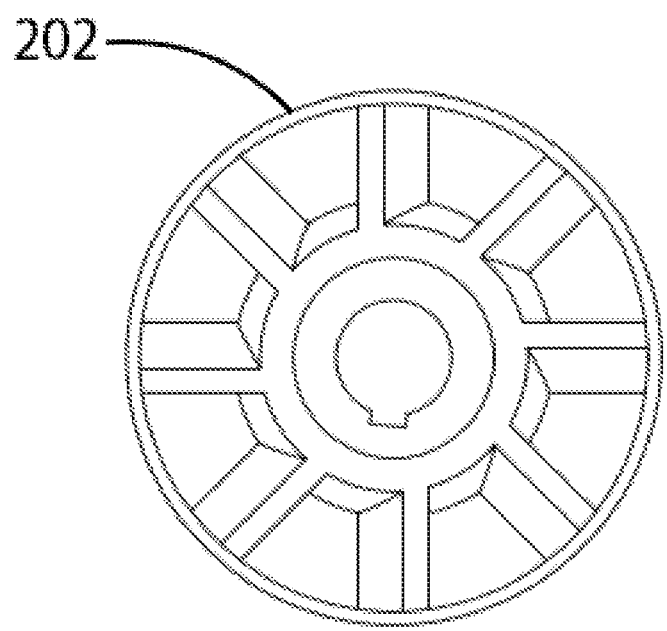
FIG. 4 is a bottom view of a dispersing mechanism according to an implementation of the disclosure.
Figure 5:
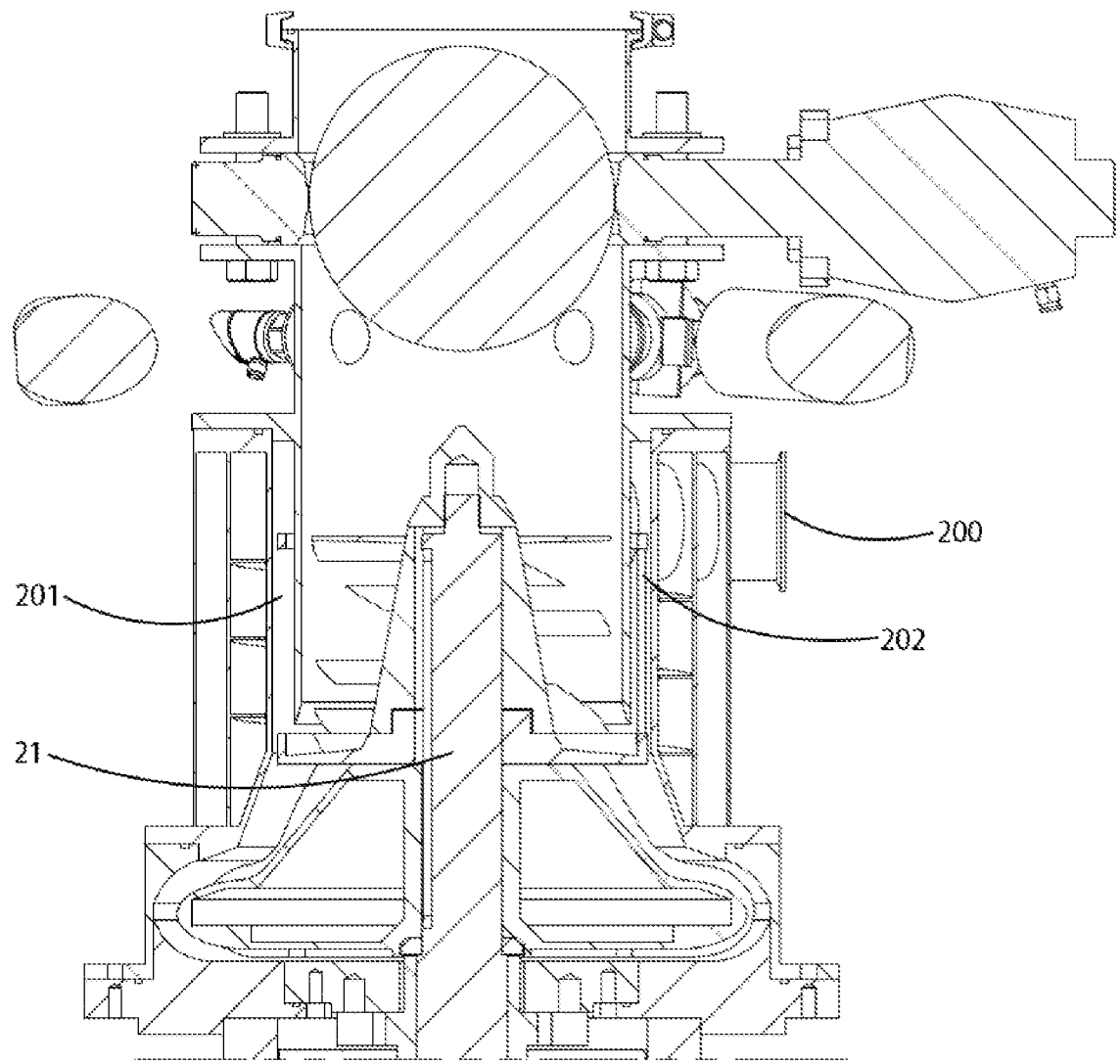
FIG. 5 is a schematic cross-sectional view of a device according to an implementation of the disclosure.
Figure 6:
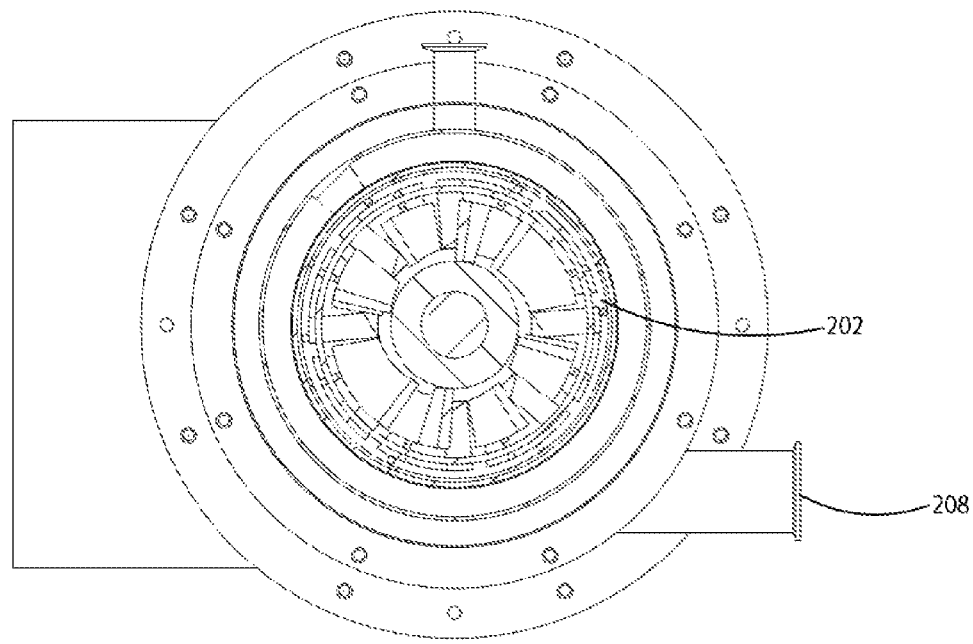
FIG. 6 is a top view of a device according to an implementation of the disclosure.
Figure 7:
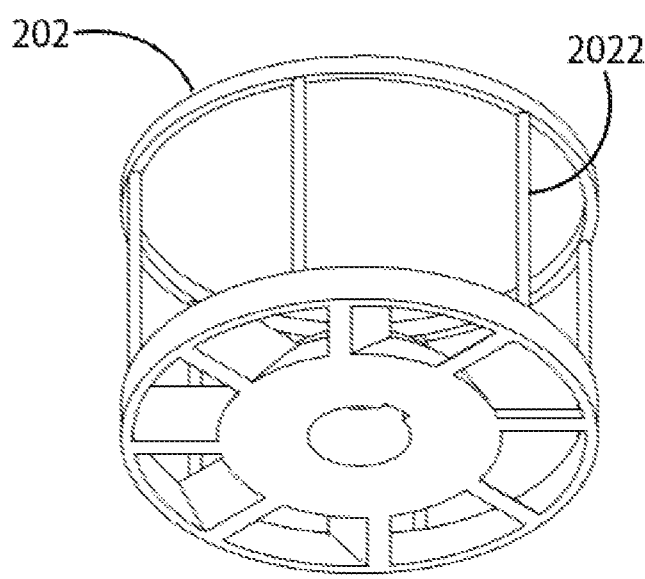
FIG. 7 is a schematic structural view of a dispersing mechanism according to an implementation of the disclosure.

In the device 20 of the disclosure, the powder enters the feed chamber from the powder feed port, and is pulverized into finer particles by the powder pulverizing mechanism 206, and also rotates with the powder pulverizing mechanism 206. Because the lower portion of the powder feed chamber 205 is in communication with the mixing chamber, the powder close to the mixing chamber is sucked by the slurry rotating downward in the mixing chamber into the mixing chamber, to mix the slurry and the powder. Further, the powder pulverizing mechanism 206 includes multiple layers of blades, and can sufficiently pulverize the powder into finer particles, making it convenient for the slurry rotating and flowing downward to suck the powder into the mixing chamber. Further, the liquid feed chamber 201 surrounds the powder feed chamber 205, and the liquid feed chamber 201 is of a ring-shaped structure (as shown in FIG. 2). Such an arrangement renders a narrow cross-section of the liquid feed chamber 201 and a high flow rate of the slurry, which, together with the shearing effect of the dispersing mechanism 202 on the slurry, make it easier to form a homogeneously mixed slurry. The slurry is fed from the liquid feed chamber 201, enters the mixing chamber, and is then driven by the impeller 207 to form a liquid ring rotating downward. Because the powder pulverizing mechanism 206, the dispersing mechanism 202, and the impeller 207 are all fixedly connected to the main shaft 21 and have the same rotation speed, i.e., have basically consistent rotation speeds when the powder and the slurry enter the mixing chamber, the slurry has a very low relative speed when coming into contact with the impeller 207, and is not likely splash. The pulverized powder is easier to mix homogeneously after being sucked into the mixing chamber. Further, the dispersing mechanism 202 may be a cylinder-shaped dispersing wheel 2020 (as shown in FIG. 3 and FIG. 4), or may include multiple stirring paddles 2022 distributed in a circumferential direction. Specifically, the stirring paddles 2022 are distributed homogeneously in the circumferential direction, and the stirring paddles 2022 are blade-shaped or cylinder-shaped paddles (as shown in FIG. 7).

The slurry is pumped into the liquid feed chamber 201 in the device 20 from a slurry buffer tank, is dispersed by the dispersing mechanism 202, enters the mixing chamber provided with the impeller 207, and is mixed homogeneously with the powder in the mixing chamber and then discharged to the slurry buffer tank. In addition, before reaching a discharge criterion, the slurry is recirculated between the slurry buffer tank and the recirculation mixing and dispersing apparatus. The slurry enters the liquid feed chamber 201 from the liquid feed port 200, is dispersed by the dispersing mechanism 202, and then enters the upper portion of the mixing chamber. The impeller 207 causes the slurry to form a liquid ring rotating and flowing downward on a wall surface of the mixing chamber. With the arrangement of the dispersing wheel 2020 or the stirring paddles 2022 of the dispersing mechanism 202 for enhancing the dispersing effect, the slurry is already dispersed homogeneously before entering the mixing chamber, so that when the pulverized powder is sucked into the slurry for mixing in the mixing chamber, the powder is not likely to agglomerate into disperse lumps, and a homogeneous slurry can be obtained. It should be understood that if other mixing methods such as that of directly pouring the powder into the mixing chamber in the form of lumps or adding the slurry to a chamber storing the powder are used, the formation of lumps which are difficult to disperse is likely to occur. This is because when the bulky powder is directly mixed the slurry, large lumps may still be formed even if the impeller 207 is used for stirring. It is difficult for the center of the lump to be wet by the slurry, and a compact outer surface is already formed by mixing of the powder and the slurry, making it difficult for the lumps formed to break down. In the disclosure, the powder is sucked by the slurry rotating downward into the mixing chamber for mixing, to prevent the slurry and the powder from forming a compact lump before being further dispersed, thereby avoiding the above problems arising due to the use of other mixing methods. Therefore, the method of the disclosure can produce a more uniform mixture, is less prone to agglomeration, and thus a relatively short dispersion time is costed, thereby improving the production efficiency.

In the related art, for example, in Patent 71U, the mixed slurry is discharged by the twin-screw pump connected at the exit. However, in this design, it is difficult to match the discharge speed with the feed speed of liquid and powder. As a result, the discharge speed may be too high, which leads to interrupted flow and a low slurry filling rate, affecting the mixing and dispersing effect; or may be too low, which leads to a backflow of the slurry to the chamber involved in the previous treatment to cause blockage and damage the apparatus. Apparently, the latter case has unacceptable impact on production and manufacturing. Therefore, in practice, the apparatus in Patent 71U cannot resolve the problems of low slurry filling rate and poor mixing and dispersing effect. In addition, in Patent 25U and Patent 82A, the powder and the liquid are mixed and dispersed by the frustum-shaped impeller, and then centrifugally discharged from the lower portion of the impeller, and the discharge pump in Patent 71U is not required. For the devices in Patent 25U and Patent 82A, the main dispersing area of is a part having a large diameter at the lower portion of the impeller and close to the discharge opening. The discharge capacity is determined by the rotation speed of the impeller, which determines the dispersing strength in turn. Generally, to reach a specific dispersing strength, the impeller needs to operate at a particular rotation speed, which, however, cannot be set to an equilibrium point at which the discharge speed matches the feed speed. To prevent slurry backflow and blockage, the apparatus has to operate at a high discharge speed and a low chamber filling rate. As a result, the mixing and dispersing effect is reduced. In the disclosure, because the slurry in the liquid feed chamber is driven by new slurry fed to the liquid feed chamber to flow into the mixing chamber, the liquid feed chamber can be filled up with the slurry, thereby achieving a better dispersing effect and improving the operating efficiency.

When the dispersing wheel 2020 rotates at a high speed, the dispersing wheel 2020 has a strong shearing effect on the slurry in gaps, thereby achieving a good dispersing effect. In another implementation, as shown in FIG. 1, FIG. 2, and FIG. 3, holes 2021 are provided on the dispersing wheel 2020. In another implementation, slots are defined on the dispersing wheel 2020, or knurls or grooves are defined on a surface of the dispersing wheel 2020, to facilitate flowing of the slurry and enhance the dispersing effect. It should be understood that the foregoing implementations of facilitating flowing of the slurry and enhancing the shearing effect may be used in combination, and the disclosure is not limited to cases where only one of the implementations is used.

In another implementation, a gap between the dispersing wheel 2020 and an inner wall of the liquid feed chamber 201 ranges from 0.5 millimeters to 10 millimeters and a gap between the dispersing wheel 2020 and an outer wall of the liquid feed chamber 201 ranges from 0.5 millimeters to 10 millimeters. Further, the gap between the dispersing wheel 2020 and the inner wall of the liquid feed chamber 201 ranges from 1 millimeter to 5 millimeters, and the gap between the dispersing wheel 2020 and the outer wall of the liquid feed chamber 201 ranges from 1 millimeter to 5 millimeters. The inner wall is a wall of the liquid feed chamber 201 close to the powder feed chamber 205, and the outer wall is a wall of the liquid feed chamber 201 close to the cooling water interlayer 203. The gap between the dispersing wheel 2020 and the inner wall of the liquid feed chamber 201 and the gap between the dispersing wheel 2020 and the outer wall of the liquid feed chamber 201 mainly affect the shearing rate. A smaller gap indicates a higher shearing rate, but an excessively small gap poses a risk of wall scraping. The gap between the dispersing wheel 2020 and the inner wall may normally the same as the gap between the dispersing wheel 2020 and the outer wall, but may also be randomly selected from the foregoing ranges. For example, the gap between the dispersing wheel 2020 and the inner wall of the liquid feed chamber 201 ranges from 0.5 millimeters to 10 millimeters, and the gap between the dispersing wheel 2020 and the outer wall of the liquid feed chamber 201 ranges from 1 millimeter to 5 millimeters.

In another implementation, a gap between the stirring paddle 2022 and an inner wall of the liquid feed chamber 201 ranges from 0.5 millimeters to 10 millimeters, and a gap between the stirring paddle 2022 and an outer wall of the liquid feed chamber 201 ranges from 0.5 millimeters to 10 millimeters. Further, the gap between the stirring paddle 2022 and the inner wall of the liquid feed chamber 201 ranges from 1 millimeter to 5 millimeters, and the gap between the stirring paddle 2022 and the outer wall of the liquid feed chamber 201 ranges from 1 millimeter to 5 millimeters. Similar to the implementation of the dispersing wheel, the gap between the stirring paddle 2022 and the inner wall may normally be the same as the gap between the stirring paddle 2022 and the outer wall, but alternatively, the gap between the stirring paddle 2022 and the inner wall may also be different from the gap between the stirring paddle 2022 and the outer wall.

Because the slurry is sheared by the dispersing mechanism in the narrow liquid feed chamber 201, a higher shearing strength is achieved. In addition, the liquid feed chamber 201 is filled up with the slurry, there is a sufficient retention time for the slurry to be sufficiently dispersed.

In another implementation, a discharge dispersing mechanism is arranged in a discharge area at the lower portion of the mixing chamber. By such an arrangement, the slurry can be dispersed again and then discharged, to further improve the homogeneousness of the slurry.

Figure 8:
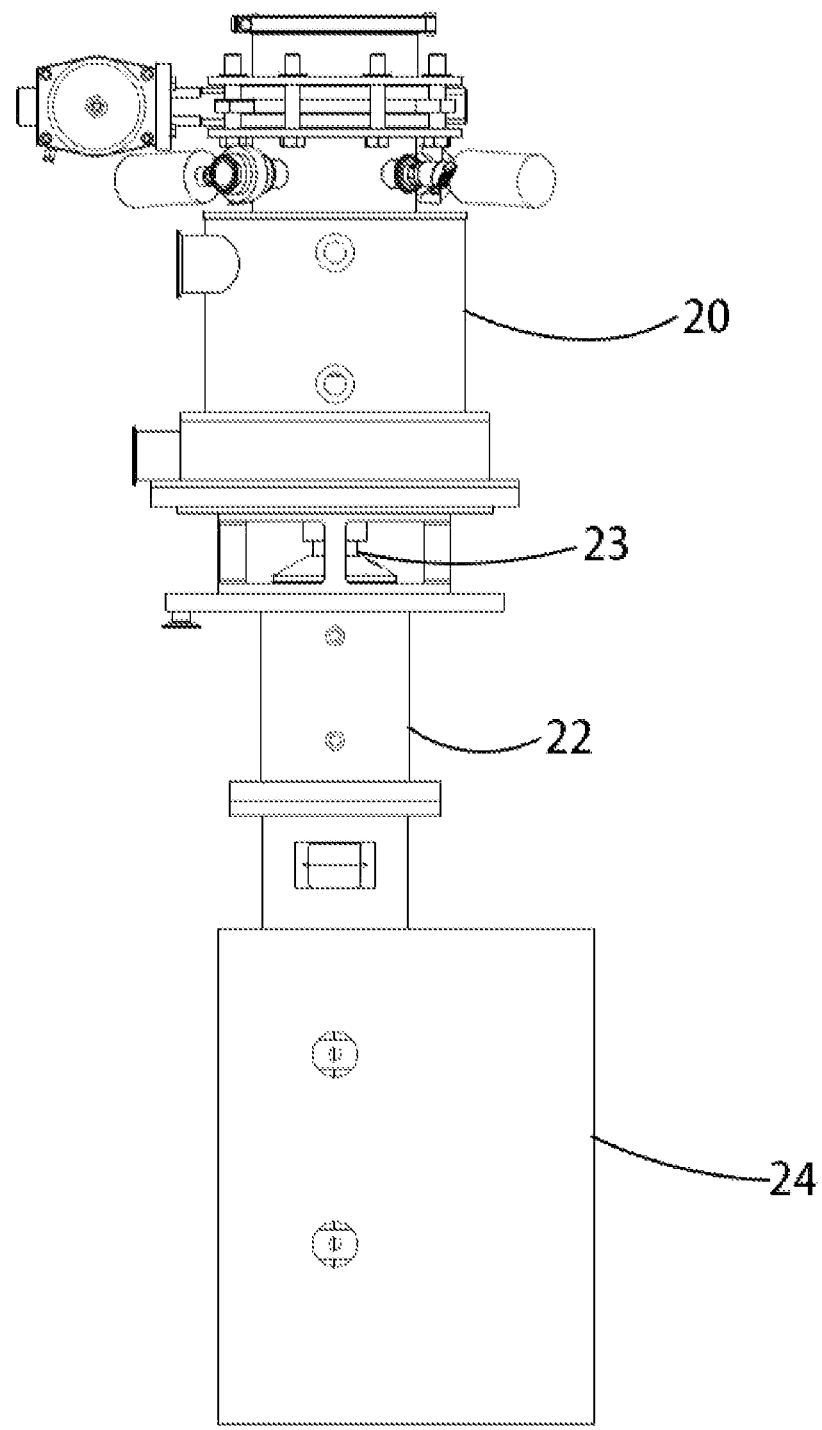
FIG. 8 is a schematic structural view of an apparatus according to an implementation of the disclosure.

According to a second aspect, as shown in FIG. 8, an apparatus for mixing and dispersing a solid and a liquid is provided in the disclosure. The apparatus includes the device 20 according to the first aspect. A lower portion of the device 20 is sealed by a sealing device 23, to prevent leakage of a slurry in the device 20 and prevent air from entering the device 20 to affect mixing of the slurry. A bearing 22 and a motor 24 are arranged at the lower portion of the device 20. The bearing 22 is arranged above the motor 24. The motor 24 is configured to drive the main shaft 21 to rotate, so that the powder pulverizing mechanism 206, the dispersing mechanism 202, and the impeller 207 can be rotated under the rotation of the main shaft 21, thereby separately dispersing powder and the slurry and then homogeneously mixing the powder and the slurry.

It should be noted that, the modules included in the foregoing implementations are merely divided according to functional logic. The units are not limited to the foregoing division as long as they can implement a corresponding function. In addition, specific names of functional units are also only for the convenience of differentiating each other, and are not intended to limit the protection scope of the disclosure. Unless otherwise clearly specified and defined, terms such as "installation", "interconnection", and "connection" shall be understood in a broad sense, for example, may be a fixing connection, a detachable connection, an integral connection, a mechanical connection, an electrical connection, a direct connection, an indirect connection by using an intermediate medium, or communication between interiors of two components. Persons of ordinary skill in the art may understand the specific meanings of the foregoing terms in the invention of the disclosure according to specific situations.

The foregoing descriptions are merely exemplary implementations of the disclosure, but are not intended to limit the disclosure. Any modifications, equivalent substitutions, and improvements made within the spirit and principle of the disclosure shall fall within the protection scope of the disclosure.

What is claimed is:

1. A device for mixing and dispersing a solid and a liquid, the device being configured for battery manufacturing and comprising:
    a powder pulverizing mechanism fixedly connected to a main shaft, wherein the powder pulverizing mechanism is located in a powder feed chamber, and the powder feed chamber is provided with a powder feed port;
    a liquid feed chamber is arranged on an outer side of the powder feed chamber, the liquid feed chamber is provided with a liquid feed port, and the liquid feed chamber is provided therein with a dispersing mechanism fixedly connected to the main shaft, wherein the dispersing mechanism is configured to disperse a slurry into a mixing chamber; and
    a lower portion of the liquid feed chamber and a lower portion of the powder feed chamber are separately in communication with an upper portion of the mixing chamber, the mixing chamber is provided therein with an impeller fixedly connected to the main shaft, and a lower portion of the mixing chamber is provided with a tangential discharge opening.

2. The device according to claim 1, wherein the liquid feed chamber surrounds the powder feed chamber, and the liquid feed chamber is of a ring-shaped structure.

3. The device according to claim 1, wherein the powder pulverizing mechanism comprises a plurality of layers of blades.

4. The device according to claim 1, wherein the dispersing mechanism is a cylinder-shaped dispersing wheel.

5. The device according to claim 1, wherein the dispersing mechanism comprises a plurality of stirring paddles distributed in a circumferential direction.

6. The device according to claim 4, wherein holes or slots are defined on the dispersing wheel.

7. The device according to claim 4, wherein a gap between the dispersing wheel and an inner wall of the liquid feed chamber ranges from 0.5 millimeters to 10 millimeters, and a gap between the dispersing wheel and an outer wall of the liquid feed chamber ranges from 0.5 millimeters to 10 millimeters.

8. The device according to claim 7, wherein the gap between the dispersing wheel and the inner wall of the liquid feed chamber ranges from 1 millimeter to 5 millimeters, and the gap between the dispersing wheel and the outer wall of the liquid feed chamber ranges from 1 millimeter to 5 millimeters.

9. The device according to claim 5, wherein a gap between the stirring paddle and an inner wall of the liquid feed chamber ranges from 0.5 millimeters to 10 millimeters, and a gap between the stirring paddle and an outer wall of the liquid feed chamber ranges from 0.5 millimeters to 10 millimeters.

10. The device according to claim 9, wherein the gap between the stirring paddle and the inner wall of the liquid feed chamber ranges from 1 millimeter to 5 millimeters, and the gap between the stirring paddle and the outer wall of the liquid feed chamber ranges from 1 millimeter to 5 millimeters.

11. The device according to claim 1, wherein a discharge dispersing mechanism, configured to disperse and discharge a slurry, is arranged in a discharge area at the lower portion of the mixing chamber.

12. The device according to claim 1, wherein a hydraulic pressure is formed in the liquid feed chamber, and a liquid is allowed to quickly flow in the dispersing mechanism.

13. The device according to claim 5, wherein the stirring paddles are blade-shaped or cylinder-shaped.

14. The device according to claim 1, wherein a cooling water interlayer is arranged on an outer side of the liquid feed chamber.

15. The device according to claim 14, wherein a heat insulation layer is arranged on an outer side of the cooling water interlayer.

16. An apparatus for mixing and dispersing a solid and a liquid, the apparatus being configured for battery manufacturing and comprising a device, the device comprising a powder pulverizing mechanism, wherein the powder pulverizing mechanism is fixedly connected to a main shaft, wherein the powder pulverizing mechanism is located in a powder feed chamber, and the powder feed chamber is provided with a powder feed port;

a liquid feed chamber is arranged on an outer side of the powder feed chamber, wherein the liquid feed chamber is provided with a liquid feed port, the liquid feed chamber is provided therein with a dispersing mechanism fixedly connected to the main shaft, and the dispersing mechanism is configured to disperse a slurry into a mixing chamber;

a lower portion of the liquid feed chamber and a lower portion of the powder feed chamber are separately in communication with an upper portion of the mixing chamber, the mixing chamber is provided therein with an impeller fixedly connected to the main shaft, and a lower portion of the mixing chamber is provided with a tangential discharge opening; and a lower portion of the device is connected to a sealing device, wherein a bearing and a motor are arranged at the lower portion of the device.

17. The apparatus according to claim 16, wherein the liquid feed chamber surrounds the powder feed chamber, and the liquid feed chamber is of a ring-shaped structure.

18. The apparatus according to claim 16, wherein the powder pulverizing mechanism comprises a plurality of layers of blades.

19. The apparatus according to claim 16, wherein the dispersing mechanism is a cylinder-shaped dispersing wheel.

20. The apparatus according to claim 16, wherein the dispersing mechanism comprises a plurality of stirring paddles distributed in a circumferential direction.

* * * * *